United States Patent [19]

Kim

[11] Patent Number: 5,291,342
[45] Date of Patent: Mar. 1, 1994

[54] MULTIFUNCTIONAL CONTROL TYPE VIDEO HEAD SELECTING DEVICE AND METHOD THEREOF

[75] Inventor: Yong-jin Kim, Kyuggi, Rep. of Korea

[73] Assignee: SamSung Electronics Co., Ltd., Kyungki, Rep. of Korea

[21] Appl. No.: 384,753

[22] Filed: Jul. 25, 1989

[30] Foreign Application Priority Data

Dec. 31, 1988 [KR] Rep. of Korea ............ 88-18086

[51] Int. Cl.$^5$ ............................................. H04N 5/78
[52] U.S. Cl. .................................... 360/10.3; 360/64; 360/69
[58] Field of Search ............... 360/10.3, 61, 64, 69, 360/84; 358/312, 335

[56] References Cited

U.S. PATENT DOCUMENTS 4,760,474  7/1988  Takimoto ............................ 360/64

FOREIGN PATENT DOCUMENTS 0138457  4/1985  European Pat. Off. .

*Primary Examiner*—Andrew L. Sniezek
*Attorney, Agent, or Firm*—Robert E. Bushnell

[57] ABSTRACT

A multifunctional control device and method is used to determine a head channel selecting signal for playback heads of a video tape recorder and for controlling a phase shift direction of a video signal according to a desired reproduction mode. The video tape recorder has four heads, a first pair for use during standard play and a second pair for use during super long play. The heads read out recorded video signals and a first switch is connected to the first pair of heads and a second switch is connected to the second pair of heads for selectively providing outputs to corresponding amplifiers, under control of a servo controller. A third switch is connected to the outputs of the amplifiers for providing outputs under control of a microcomputer. The microcomputer controls the servo controller which in turn controls the speed of a drum motor and a capstan motor. The microcomputer also provides a phase shift direction controlling signal. An output of the servo controller is provided to the microcomputer along with an output of a comparator comparing the outputs of the amplifiers.

20 Claims, 4 Drawing Sheets

CONVENTIONAL CIRCUIT

CONVENTIONAL CIRCUIT WAVEFORMS

MULTIFUNCTIONAL CONTROL TYPE VIDEO HEAD SELECTING DEVICE AND METHOD THEREOF

FIELD OF THE INVENTION

The present invention relates to a multifunctional video tape recorder and particularly to a multifunctional control type video head selecting device and a method thereof, in which a required head can be selected during a special reproducing, and the phase shift direction of the reproduced video signal can be automatically controlled in accordance with the head thus selected.

BACKGROUND OF THE INVENTION

Generally, a multifunctional video tape recorder has not only a normal function for reproducing tapes in a normal manner, but also has special functions such as still picture reproducing, slow picture reproducing, high speed reproducing, double speed reproducing and the like. In order to perform the above-mentioned functions, the multifunctional video tape recorder is provided with two pairs of heads which are different in their head widths in the double-azimuth head type. Of the two pairs of heads, one pair are used in a standard play i.e., SP, mode while the other pair are used in a super long play i.e., SLP, mode.

Therefore, in a multifunctional video tape recorder, the reproducing head should be selected in accordance with the designation of the user, and the phase shift direction of the video signal reproduced in accordance with the head thus selected has to be controlled. The controlling of the phase shift direction of the video signal shifted occurs in the video signal reproducing processor unit. In a VHS-type video tape recorder, the phase of the video signal is advanced by 90° for every horizontal line for a given track and conversely, the phase is delayed by 90° for every horizontal line for the adjacent track to the given track, so that a crosstalk component of the reproduced video signal will be removed. The conventional circuit for head selecting and phase shift direction controlling is constituted as shown in FIG. 1, and this circuit will be described as to its operation below.

A microcomputer 100 generates function control data for the reproducing function designated by the user, and this data is supplied to both a servo controller 104 and a multifunctional controller 105. The servo controller 104 controls the speeds of a drum motor M1 and a capstan motor M2 through lines 2 and 3 respectively, by means of the function controlling data which is supplied from the microcomputer 100 through a bus line 1, while the servo controller 104 also controls switching operations of first and second switches SW1, SW2 through a line 4, and sends a head channel selection signal to a multifunctional controller 105.

The multifunctional controller 105 outputs an amplifier selecting signal through a line 6 in accordance with a function control data supplied through bus line 1, the head channel selecting signal supplied through line 4, and a comparing signal supplied through a line 5 from a comparator 103, while the multifunctional controller 105 also outputs a phase shift direction controlling signal through a line 7. Then the switching operation of third switch SW3 is controlled in accordance with the amplifier selecting signal.

First the normal reproducing function will be described. The normal reproducing function can be described based on a classification into the standard play mode and the super long play mode, and special reproducing can also be described based on a classification into the standard play mode and the super long play mode.

First in the case of the standard play mode in the normal reproducing function, the first switch SW1 alternately supplies to a first amplifier 101 video signals read out by first and second heads SP1, SP2 in response to the head channel selecting signal. The first amplifier 101 which receives the video signals through the first switch SW1 amplifies the video signals at a constant amplifying rate, and supplies them to the third switch SW3, while the third switch SW3 outputs the output signals of the first amplifier 101 through a line 8 in accordance with the amplifier selecting signal.

Meanwhile, the phase shift direction controlling signal is generated in response to the azimuth angle of the selected head according to the first and second heads SP1, SP2 which are alternately selected. Thus, if the first head SP1 having an azimuth angle of +6° is selected, the phase shift direction controlling signal is generated as a high logic state while, if the second head SP2 having an azimuth angle of −6° is selected, the phase shift direction controlling signal is generated as a low logic state.

Second, in the case of the super long play mode in the normal reproducing function, the second switch SW2 supplies to a second amplifier 102 the video signals read out alternately by third and fourth heads SLP1, SLP2. The second amplifier 102 amplifies the video signals incoming through the second switch SW2 at a constant amplifying rate to output them to the third switch SW3, while the third switch SW3 transmits the output signals of the second amplifier 102 through a line 8 in response to the amplifier selecting signal. Then each time the third and fourth heads SLP1, SLP2 are selected, the phase direction controlling signal is generated in response to the azimuth angle of the selected head. Thus, if the third head SLP1 having an azimuth angle of +6° is selected, the phase shift direction controlling signal is generated as a high state while, if the fourth head SLP2 having an azimuth angle of −6° is selected, the phase shift direction controlling signal is generated as a low state. Further, in the case of multifunctional reproducing functions, i.e., in the case of the special functions, the tape runs at a speed different from that of the normal reproducing function and therefore, correct readings can not be made from the tape.

Within a single time interval between the changeovers of the head channels, a plurality of video tracks will pass, and therefore, the first to fourth heads SP1, SP2, SLP1, SLP2 will move simultaneously or separately. Therefore, the heads can be selected in synchronization with the comparing signal which is the output of the comparator 103, or the heads can be selected in synchronization with the head channel selecting signal for reading out the video signals from a proper head within a single time interval. In the case of multifunctional reproducing functions, the selections of the heads are made as specified in Table 1—1 below, while the wave patterns of the amplifier selection signals and the phase shift direction controlling signals are shown in FIG. 2. Meanwhile, the heads and amplifiers selected in accordance with the head channel selecting signal and the amplifier selecting signal, and the phase shift direction controlling signal generated in accordance with them, are as shown in Table 1-2 below.

TABLE 1-1

| Function | Video head selected |
|---|---|
| Normal reproducing | SP: SP1, SP2 |
| | SLP: SLP1, SLP2 |
| Still picture reproducing | SP: SP2, SLP2 |
| | SLP: SP1, SLP1 |
| Slow picture reproducing | SP: SP2, SLP2, SP1 |
| | SLP: SLP1, SP1, SLP2 |
| Double speed reproducing | SP: SP2, SLP2 |
| | SLP: SP1, SLP1 |
| High speed reproducing | SP: SP1, SP2, SLP1, SLP2 |
| | SLP: SLP1, SLP2 |

TABLE 1-2

| Item | Operating voltage | Selection | Remarks |
|---|---|---|---|
| Head channel selecting signal | SP: H | SP2 | SP1: +6° |
| | L | SP1 | SP2: −6° |
| | SLP: H | SLP1 | SLP1: +6° |
| | L | SLP2 | SLP2: −6° |
| AMP selecting signal | H | AMP1 | AMP1: SP head |
| | L | AMP2 | AMP2: SLP head |
| Phase shift direction controlling signal | H | +6° | |
| | L | −6° | |

As described above, the conventional circuit for generating the head channel selecting signal and the phase shift direction controlling signal is very complicated because it selects the amplifiers and generates the phase shift direction controlling signal through a multifunctional controller 105.

SUMMARY OF THE INVENTION

Therefore, it is a first objective of the present invention to provide a multifunctional control type video head selecting device which is software controlled and used to determine a head channel selecting signal for selecting heads and automatically controlling the phase shift direction controlling signal of the video signal produced in a multifunctional video tape recorder having four heads adopting a double azimuth head type, thereby simplifying a circuit for the multifunctional control type video head selecting device.

It is a second object of the present invention to provide a multifunctional control type video head selecting method.

In achieving the first object, the device of the present invention comprises:

first and second heads for standard plays and for reading out video signals recorded on the tape; third and fourth heads for super long plays and for reading out video signals recorded on the tape; a first switch for selectively outputting the outputs of the first and second heads; a second switch for selectively transmitting the outputs of the third and fourth heads; a third switch connected to the output terminals of the first and second switches, and for outputting through a line the outputs of the first and second switches; a servo controller for generating head channel selecting signal in order to control the switching operations of the first and second switches and to control a drum motor and a capstan motor; a comparator for comparing the outputs of the first and second switches; and a microcomputer for generating control signals in order to control the servo controller, for generating amplifier selecting signals in order to control the switching operations of the third switch in accordance with the head channel selecting signal, i.e., the output of the servo controller, and a comparing signal, i.e., the output of the comparator, and for generating phase shift direction controlling signal in order to control the phase shift direction of the video signal reproduced in response to the azimuth angle of the selected head.

In achieving the second object, the method of the present invention comprises:

a first step of checking the key data which is inputted by means of a key to make an indication as to whether the reproducing function designated by the user is a normal reproducing function, a still picture reproducing function, a double speed reproducing function, a slow picture reproducing function, or a high speed reproducing function, each time the head channel selecting signal is inputted;

a second step for making a judgment on whether the running mode is a standard play mode or not, after checking the running speed of the tape, in the case where a normal reproducing function is detected in the first step;

a third step for making a judgment as to whether a standard play mode is being run, after checking the running speed of the tape, in the case where a still picture reproducing function or a double speed reproducing function is detected in the first step above;

a fourth step for making a judgement as to whether a standard play mode is being run, after checking the running speed of the tape upon inputting of a comparing signal, in the case where a high speed reproducing function is detected in the first step;

a fifth step for making a judgment as to whether a standard play mode is being run, after checking the running speed of the tape, in the case where a slow picture reproducing function is detected in the first step;

a sixth step for making a judgment as to whether a tape running state is encountered, in the case where a standard play mode is detected in the fifth step;

a seventh step for making a judgment as to whether a tape running state is encountered, in the case where a standard play mode is not detected in the fifth step;

an eighth step for selecting the first amplifier, and for generating a phase shift direction controlling signal having a phase opposite to that of the head channel selecting signal, in the case where a standard play mode is detected in the second step;

a ninth step for selecting the second amplifier, and for generating a phase shift direction controlling signal having the same phase as that of the head channel selecting signal, in the case where a standard play mode is not detected in the second step;

a tenth step for alternately selecting the first and second amplifiers in such a manner that the amplifier selecting signal should have the same phase as that of the head channel selecting signal, and for generating a phase shift direction controlling signal having a ground logic state, in the case where either a standard play mode is encountered in the third step or a tape running state is not encountered in the seventh step;

an eleventh step for alternately selecting the first and second amplifiers in such a manner that the amplifier selecting signal should have a phase opposite to that of head channel selecting signal, and for generating a phase shift direction controlling signal having a high logic state in the case where either a standard play mode is not encountered in the third step, or a tape running state is not encountered in the sixth step;

a twelfth step for alternately selecting the first and second amplifiers in such a manner that the amplifier selecting signal should have the same phase as that of the comparing signal, for generating a phase shift direction controlling signal having a phase opposite to that of the comparing signal if the head channel selecting signal has a logic state of a high logic level, and for generating a phase shift direction controlling signal having the same phase as that of the comparing signal if the head channel selecting signal has a ground logic state, in the case where a standard play mode is encountered in the fourth step, or a tape running state is encountered in the sixth step; and a thirteenth step for selecting the second amplifier, and for generating a phase shift direction controlling signal having the same phase as that of the head channel selecting signal, in the case where a standard play mode is not encountered in the fourth step or a tape running state is encountered in the sixth step.

BRIEF DESCRIPTION OF THE DRAWINGS

The above objects and other advantages of the present invention will become more apparent by describing the preferred embodiment of the present invention in more detail with reference to the attached drawings in which.

DESCRIPTION OF THE PREFERRED EMBODIMENT

Figure 1:
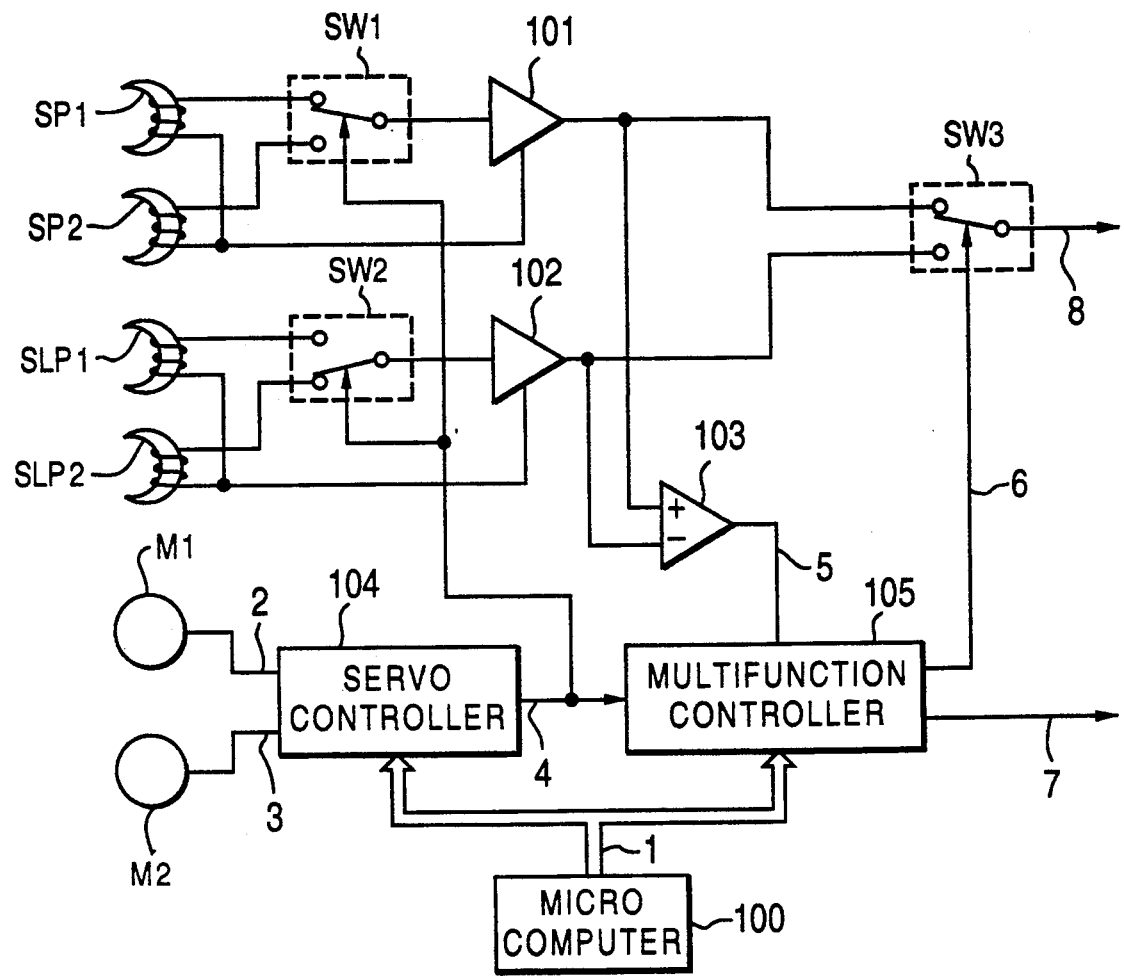
FIG. 1 illustrates the conventional circuit.
Figure 2:
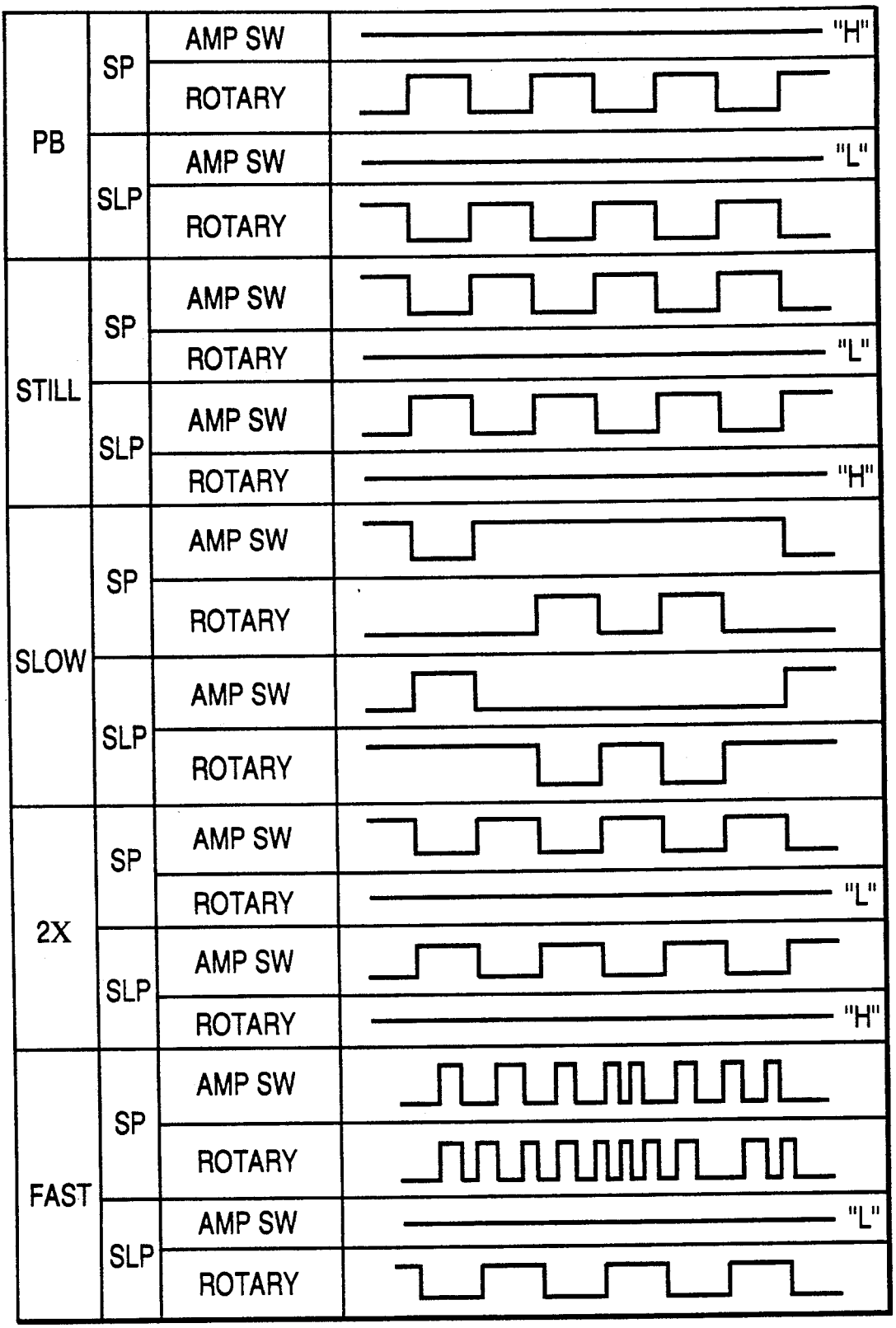
FIG. 2 illustrates the operating wave patterns of different modes for the circuit of FIG. 1.
Figure 3:
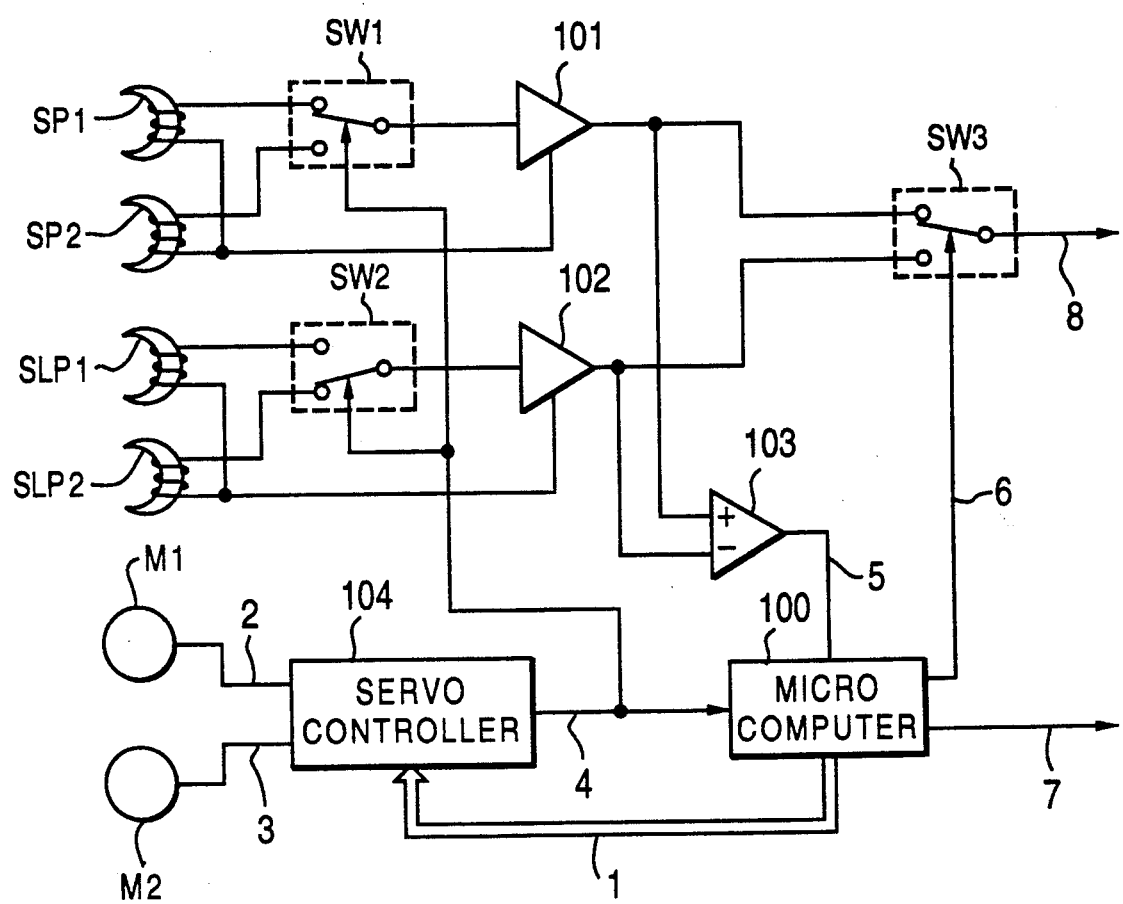
FIG. 3 illustrates the circuit of the multifunctional control type video head selecting device according to the present invention.

FIG. 3 illustrates the circuit of the multifunctional control type video head selecting device according to the present invention, which comprises: first and second heads SP1, SP2, for standard play and for reading the video signals recorded on the tape; a first amplifier 101 for amplifying and outputting the outputs of the first and second heads SP1, SP2; third and fourth heads SLP1, SLP2 for super long plays and for reading the video signals recorded on the tape; a second amplifier 102 for amplifying and outputting the outputs of the third and fourth heads SLP1, SLP2; a first switch SW1 connected between the first and second heads SP1, SP2 and the first amplifier 101, and for selectively outputting the output of the first head SP1 or of the second head SP2 connected between the third and fourth heads SLP1, SLP2 and the second amplifier 102, and for transferring selectively the output of the third head SLP1 or of the fourth head SLP2 to the second amplifier 102; a third switch SW3 connected to the output terminals of the first and second amplifiers 101, 102, and for selectively outputting the output of the first amplifier 101 or of the second amplifier 102 through a line 8; a servo controller 104 for generating head channel selecting signal in order to control a drum motor M1 and a capstan motor M2, and to control the switching operations of the first and second switches SW1, SW2; a comparator 103 comparing the outputs of the first and second amplifiers 101, 102; and a microcomputer 100 for controlling the operations of the servo controller 104 for generating amplifier selecting signals in order to control the switching operations of the third switch SW3 in accordance with the head channel selecting signal, i.e., the output of the servo controller 104, and a comparing signal, i.e., the output of the comparator 103, and for generating phase shift direction controlling signal in order to control the phase shift direction of the video signal reproduced in response to the azimuth angle of the selected head.

Figure 4:
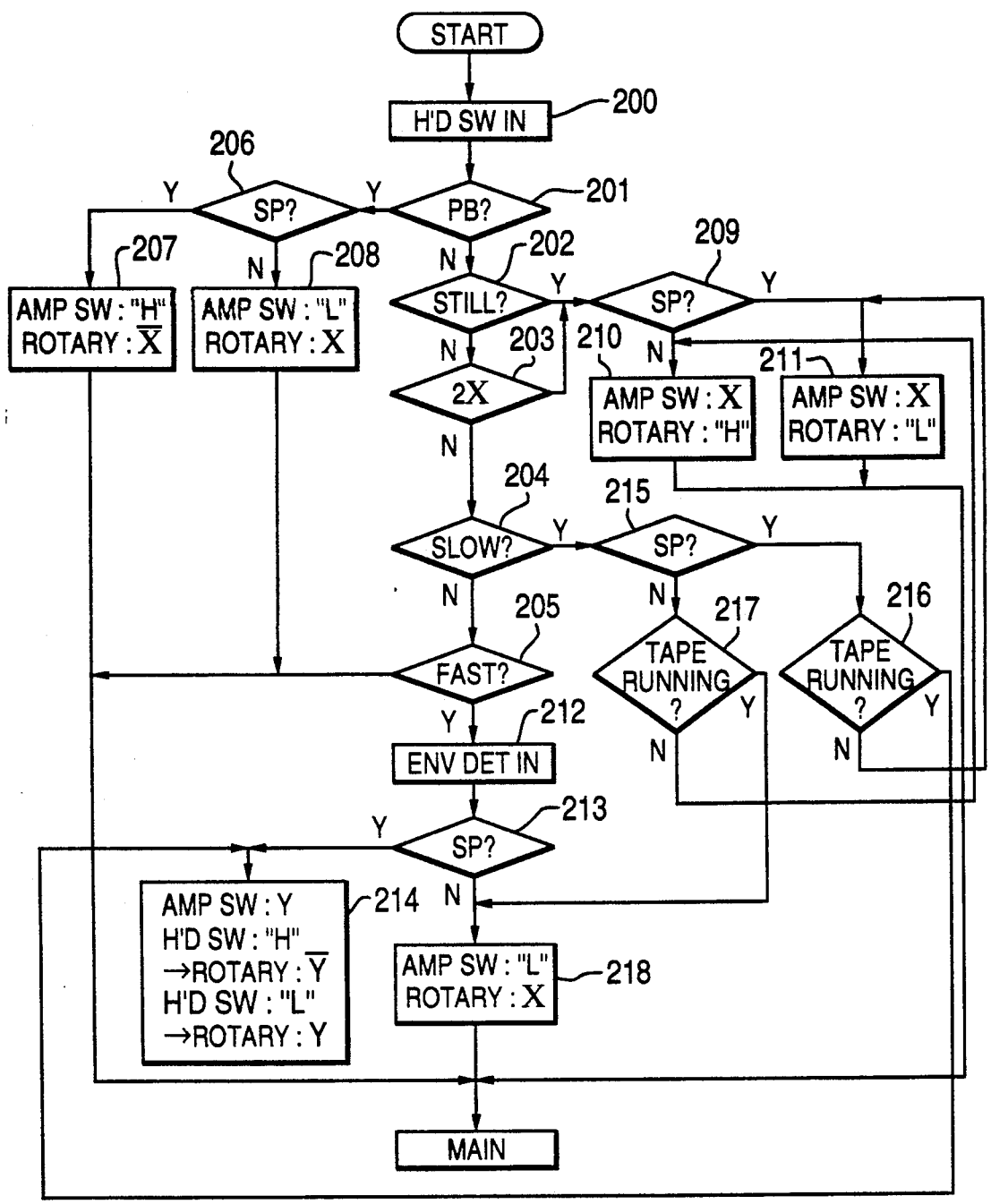
FIG. 4 illustrates the flow chart for the multifunctional control type video head selecting method according to the present invention.

FIG. 4 illustrates the flow chart of the multifunctional control type video head selecting method according to the present invention, which comprises:

a first step of checking the key data which is inputted by means of a key to make an indication as to whether the reproducing function designated by the user is a normal reproducing function, a still picture reproducing function, a double speed reproducing function, a slow picture reproducing function or a high speed reproducing function, each time the head channel selecting signal is inputted;

a second step for making a judgment as to whether a standard play mode is being run, after checking the running speed of the tape, in the case where a normal reproducing function is detected in the first step;

a third step for making a judgment as to whether a standard play mode is being run, after checking the running speed of the tape, in the case where a still picture reproducing mode or a double speed reproducing mode is detected in the first step;

a fourth step for making a judgment as to whether a standard play mode is being run, after checking the running speed of the tape upon inputting of a comparing signal, in the case where a high speed reproducing function is detected in the first step;

a fifth step for making a judgment as to whether a standard play mode is being run, after checking the running speed of the tape, in the case where a slow picture reproducing function is detected in the first step;

a sixth step for making a judgment as to whether a tape running state is encountered, in the case where a standard play mode is detected in the fifth step;

a seventh step for making a judgment as to whether a tape running state is encountered, in the case where a standard play mode is not detected in the fifth step;

an eighth step for selecting the first amplifier 101, and for generating a phase shift direction controlling signal having a phase opposite to that of the head channel selecting signal, in the case where a standard play mode is detected in the second step;

a ninth step for selecting the second amplifier 102, and for generating a phase shift direction controlling signal having the same phase as that of the head channel selecting signal, in the case where a standard play mode is not detected in the second step;

a tenth step for alternately selecting the first and second amplifiers 101, 102 in such a manner that the amplifier selecting signal should have the same phase as that of the head channel selecting signal, and for generating a phase shift direction controlling signal having a low logic state, in the case where either a standard play mode is detected in the third step or a tape running state is not detected in the seventh step;

an eleventh step for alternately selecting the first and second amplifiers 101, 102 in such a manner that the amplifier selecting signal should have a phase opposite to that of the head channel selecting signal, and for generating a phase direction controlling signal having a logic state in the case where either a standard play mode is not detected in the third step, or a tape running state is not detected in the seventh step;

a twelfth step for alternately selecting the first and second amplifiers 101, 102 in such a manner that the amplifier selecting signal should have the same phase as that of the comparing signal, for generating a phase shift direction controlling signal having a phase opposite to that of the comparing signal if the head channel selecting signal has a logic state of a high level, and for generating a phase shift direction controlling signal having the same phase as that of the comparing signal if the head channel selecting signal has a logic state of a certain level, and for generating a phase shift direction controlling signal having the same phase as that of the comparing signal if the head channel selecting signal has a ground logic state, in the case where either a standard play mode is detected in the fourth step, or a tape running state is detected in the sixth step; and a thirteenth step for selecting the second amplifier 102, and for generating a phase shift direction controlling signal having the same phase as that of the head channel selecting signal, in the case where either a standard play mode is not detected in the fourth step or a tape running state is detected in the seventh step.

The present invention constituted as above will be described in more detail referring to FIGS. 3 and 4.

Referring to FIG. 3, the first switch SW1 performs switching operations in accordance with the logic state of the head channel selecting signal applied through line 4 and therefore, the first switch SW1 will send either the output of the first head SP1 to the first amplifier 101, or the output of the first head SP2 to the first amplifier 101.

The second switch SW2 also performs switching operations in accordance with the logic state of the head channel selecting signal supplied through the line 4, and therefore, the second switch will send either the output of the third head SLP1 to the second amplifier 102 or the output of the fourth head SLP2 to the second amplifier 102.

The third switch SW3 performs switching operations in accordance with the logic state of the amplifier selecting signal, and therefore, the third switch SW3 will send either the output of the first amplifier 101 through line 8 or the output of the second amplifier 102 through line 8.

The comparator 103 compares the outputs of the first and second amplifiers 101, 102, and outputs the compared signals through a line 5 to the microcomputer 100.

The servo controller 104 controls the drum motor M1 and the capstan motor M2 through lines 2, 3 and outputs the head channel selecting signal through the line 4 to both the first and second switches SW1, SW2 and the microcomputer 100.

The servo controller 104 controls the drum motor M1 and the capstan motor M2 through lines 2, 3, and outputs the head channel selecting signal through the line 4 to both the first and second switch SW1, SW2 and the microcomputer 100.

Then, the microcomputer 100 controls the operations of the servo controller 104 and at the same time, generates an amplifier selecting signal after receipt of: a head channel selecting signal through the line 4 from the servo controller 104; a comparing signal through the line 5 form the comparator 103; and a reproducing function signal designated by the user, the amplifier selecting signal being supplied through a line 6 to the third switch SW3. As a result, the third switch SW3 will select an amplifier, and the phase shift direction controlling signal will be outputted through a line 7.

FIG. 4 illustrates the flow chart of a part of the present invention which is performed by microcomputer 100 of FIG. 3. Here, the microcomputer 100 inputs a head channel selecting signal, H'D SW in FIG. 4, from a block 200 through the line 4 to the servo controller 104 while, at blocks 201 to 205, the microcomputer 100 checks user inputted key data in order to make a judgment as to whether the data designates a normal reproducing function, a still picture reproducing function, a high speed picture reproducing function, a slow picture reproducing function, or a double speed reproducing function.

If it is found that a normal reproducing function is designated through the blocks 201-205, the microcomputer 100 will check the running speed of the tape through the servo controller 104, and will also check whether a standard play mode is running in block 206.

If a standard play mode is detected in block 206, the microcomputer 100 will generate an amplifier selecting signal, AMP SW in FIG. 4, of a high level, with the result that the first amplifier 101 will be selected, and that the first and second heads SP1, SP2 will be selected. The phase shift direction controlling signal, ROTARY in FIG. 4, will have a phase opposite to that of the head channel selecting signal in order to control the phase shift direction of the video signal reproduced in response to the azimuth angle of the selected head. That is, if the head channel selecting signal is at a low state, the first head SP1 having a gap angle of +6° is selected, thereby the phase shift direction controlling signal will be generated as a high state. On the other hand, if the head channel selecting signal is at a high state, the second head SP2 having a gap angle of −6° is selected, thereby the phase shift direction controlling signal will be generated as a low state. Therefore, the phase shift direction controlling signal should be at an opposite state relative to that of the head channel selecting signal in block 207.

If a standard play mode is not encountered at block 206, the microcomputer 100 will generate an amplifier selecting signal having a low state to select the second amplifier 102, and the phase shift direction controlling signal and the head channel selecting signal will be in phase. That is, if the head channel selecting signal is at a high state, third head SLP1 having the gap angle of +6° is selected, thereby the phase shift direction controlling signal will also be at a high state. On the other hand, if the head channel selecting signal is at a low state, fourth head SLP2 having the gap angle of −6° is selected, thereby the phase shift direction controlling signal should be also at a low state in block 208.

If a still picture reproducing function or a double speed reproducing function is encountered at blocks 203, 204, the microcomputer 100 will check the running speed of the tape through the servo controller 104 to ultimately make a judgment as to whether a standard play mode is being run in blocks 209 and 215.

If a standard play mode is encountered in block 209, the microcomputer 100 will make such an arrangement that the amplifier selecting signal and the head channel selecting signal will be in phase. That is, if the head channel selecting signal is at a high level, then the second head SP2 and the third head SLP1 will be activated, and further, if the amplifier selecting signal is at a high state, then the second head SP2 will be selected. Further, if the head channel selecting signal is at a low state, and if the amplifier selecting signal is also at a low state, then the fourth head SLP2 will be activated. Accordingly, under the above-mentioned condition, the second and fourth heads SP2, SLP2 having the gap angle of −6° will be selected, thereby the phase shift direction controlling signal will have a low state in block 211.

If a standard play mode is not detected in block 209, the microcomputer 100 will assume that a super long play mode is being run, and will generate an amplifier selecting signal having a phase opposite to that of the head channel selecting signal. Therefore, the first and third heads SP1, SLP1 having the gap angle of +6° will be selected, and the phase shift direction controlling signal will be at a high state in block 210.

If a high speed reproducing function is detected in block 205, the microcomputer 100 will receive a comparing signal, ENV DET in FIG. 4, through line 5 from the comparator 103 in block 212 and then, will check the running speed of the tape through the servo controller 104 to make a judgment whether a standard play mode is being run in block 213.

If a standard play mode is detected in block 213, the microcomputer 100 will generate an amplifier selecting signal and a phase shift direction controlling signal in accordance with the comparing signal, in such a manner that, if the comparing signal has a high state, the standard play heads SP1, SP2 will be activated, and if the comparing signal has a low state, the super long play heads will be activated. The amplifier selecting signal will have the same phase as that of the comparing signal.

The phase shift direction controlling signal have to control the phase shift direction of the video signal reproduced in response to the azimuth angle of the head selected, therefore, they are operated in accordance with the comparing signal and the head channel selecting signal. That is, if the head channel selecting signal is at a high level, the phase shift direction controlling signal will have a phase opposite to that of the comparing signal while, if the head channel selecting signal is at a low state, then the phase shift direction controlling signal will have a same phase as that of the comparing signal in block 214.

If a standard play mode is not detected at block 213, the microcomputer will assume that a super long play mode is being run, and will generate an amplifier selecting signal and a phase shift direction controlling signal in block 218, in the same manner as in block 208.

If a slow picture reproducing function is designated at block 204, the microcomputer 100 will check the running speed of the tape to make a judgment whether a standard play mode is being run in block 215.

If a standard play mode is detected at block 215, the microcomputer 100 will check through the servo controller 104 to see whether the tape is in a running state or in a stationary state in block 216.

The slow picture reproducing function includes alternate repetitions of the still picture reproducing function and the normal reproducing function, and therefore, when the tape is stationary, the second and fourth heads SP2, SLP2 will be selected while, when the tape is running, the first and second heads SP1, SP2 will be selected.

If it is detected that the tape is running at block 216, the microcomputer 100 will carry out block 214. If it is detected that the tape is not running at block 216, the microcomputer 100 will assume that the tape is stationary, and will carry out block 210.

If a standard play mode is not detected at block 215, the microcomputer 100 will assume that an super long play mode is being run, and will direct the servo controller 104 to check whether the tape is stationary or running in block 217.

If the tape is running at block 217, the microcomputer 100 will carry out block 218.

If the tape is stationary at block 217, the microcomputer 100 will carry out block 211.

As described above, the device of the present invention does not carry out the selection of the heads and the controlling of the phase shift direction of the video signal reproduced by hardware means as in the conventional device, but carries out the various functions by software means resulting in the advantages of achieving a simplified circuit by removing complicated hardware circuitry and saving manufacturing costs. Also, during a slow picture reproducing mode, the noise from head selection can be prevented because the slow picture reproducing mode is carried out in the same manner as a high speed reproducing mode during the tape running interval.

What is claimed is:

1. A multifunctional control type video head selecting method for a multifunctional control type video head selecting device, said method comprising the steps of:

inputting a head channel selection signal, generated by a servo controller, through a first line to a microcomputer;

determining in the microcomputer one of a standard, still, double speed, slow, and fast reproduction function selected by a user and providing corresponding function control data to the servo controller through a second line connected only between the microcomputer and the servo controller;

checking a running speed of a tape and detecting whether a standard play mode is being run if said determining step determines that said one of the standard, still, double speed, slow and fast reproduction function has been selected;

generating, in the microcomputer, both an amplifier selection signal having a first logic level, and a phase shift direction controlling signal having a phase opposite to a phase of said head channel selection signal if said standard play mode is detected and said standard reproduction mode has been determined;

generating, in the microcomputer, both the amplifier selection signal having a second logic level, and the phase shift direction controlling signal having said phase the same as said phase of said head channel selection signal if said standard play mode has not been detected and said standard reproduction mode has been determined;

generating, in the microcomputer, both the amplifier selection signal having the same phase as said head channel selection signal and said phase shift direction controlling signal having said second logic level if said standard play mode has been detected and one of said still and said double speed reproduction function has been determined; and generating, in the microcomputer, both the amplifier selection signal having said phase opposite the phase of said head channel selection signal, and said phase shift direction controlling signal having said first logic if said standard play mode has not been detected and said one of said still and said double speed reproduction function has been determined.

2. The multifunctional control type video head selecting method as claimed in claim 1, further comprising the steps of:
- inputting a signal from a comparator, checking the running speed of the tape and determining if said standard play mode is being run if said fast reproduction function has been determined to have been selected;
- generating, in the microcomputer, both the amplifier selection signal having the same phase as a comparing signal, and said phase shift direction controlling signal having said phase opposite said comparing signal when said head channel selection signal has said first logic level if said standard play mode has been detected;
- generating, in the microcomputer, both the amplifier selection signal having the same phase as said comparing signal, and said phase shift direction controlling signal having the same phase as said comparing signal when said head channel selection signal has said second logic level if said standard play mode has been detected; and
- generating, in the microcomputer, both the amplifier selection signal having said second logic level, and the phase shift direction controlling signal having the same phase as said head channel selection signal when said standard play mode has not been detected.

3. The multifunctional control type video head selecting method as claimed in claim 1, further comprising the steps of:
- checking the running speed of the tape and determining if said standard play mode is being run if said slow reproduction function has been determined to have been selected;
- determining if said tape is in one of a running state and a stationary state when said standard play mode has been detected;
- generating, in the microcomputer, both the amplifier selection signal having said phase opposite said head channel selection signal, and the phase shift direction controlling signal having said first logic level if said standard play mode has been detected and said stationary state has been determined;
- generating, in the microcomputer, both the amplifier selection signal having the same phase as a comparing signal, and the phase shift direction controlling signal having said phase opposite said comparing signal when said head channel selection signal has said first logic level if said standard play mode has been detected and said running state has been determined;
- generating, in the microcomputer, both the amplifier selection signal having the same phase as said comparing signal, and the phase shift direction controlling signal having the same phase as said comparing signal when said head channel selection signal has said second logic level if said standard play mode has been detected and said running state has been determined;
- determining if said tape is in said one of the running state and the stationary state when said standard play mode has not been detected;
- generating, in the microcomputer, both the amplifier selection signal being in phase with said head channel selection signal, and the phase shift direction controlling signal having said second logic level if said standard play mode has not been detected and said stationary state has been determined; and
- generating, in the microcomputer, both the amplifier selection signal having said second logic level, and the phase shift direction controlling signal having the same phase as said head channel selection signal if said standard play mode has not been detected and said running state has been determined.

4. A multifunctional control video head selecting device for use in a video tape recorder, comprising:
- first and second heads for reading during a standard play mode, a video signal recorded on a tape;
- third and fourth heads for reading during a long play mode, said video signal recorded on the tape;
- a first switch for selectively outputting the video signal read by said first and second heads;
- a second switch for selectively outputting the video signal read by said third and fourth heads;
- a third switch, connected to output terminals of said first and second switches, for outputting the video signal selectively output by said first and second switches;
- servo controller means for generating a head channel selection signal to control said outputting by said first and second switches and for generating a speed control signal to control a drum motor and a capstan motor;
- a comparator for producing a comparing signal by comparing said selected video signal output by said first switch and said selected video signal output by said second switch; and
- a microcomputer for receiving said head channel selection signal through a first line from the servo controller means, for generating control signals to control said servo controller means through a second line connected only between the microcomputer and the servo controller means, for generating an amplifier selection signal to control said third switch in accordance with the head channel selection signal and the comparing signal, for generating a phase shift direction controlling signal to control a phase shift direction of said video signal corresponding to an azimuth angle of a selected head, for determining one of a standard, still, double speed, slow, and fast reproduction function selected by a user, for checking a running speed of the tape and detecting whether said standard play mode is being run if one of a standard, still, double speed, slow and fast reproduction function has been selected, for generating said amplifier selection signal having a first logic level and generating the phase shift direction controlling signal having a phase opposite to a phase of said head channel selection signal if said standard play mode is detected and said standard reproduction mode has been determined, for generating said amplifier selection signal having a second logic level and generating the phase shift direction controlling signal having the same phase as said phase of said channel selection signal if said standard play mode has not been detected and said standard reproduction mode has been determined, for generating said amplifier selection signal having the same phase as said channel selection signal and generating the phase shift direction controlling signal having said second logic level if said standard play mode has been detected and said one of said still and said double speed reproduction function has been selected, and for generating said amplifier selection signal having said phase opposite to the phase of said channel selection signal and generating the phase shift direction controlling signal having said first logic level if said standard play mode has not been detected and said one of said still and said double speed reproduction function has been selected.

5. The selecting device of claim 4, further comprised of said microcomputer:
 inputting a comparing signal from a comparator, checking a running speed of the tape and determining if said standard play mode is being run if said fast reproduction function has been determined to have been selected;
 generating said amplifier selection signal having the same phase as said comparing signal and generating the phase shift direction controlling signal having said phase opposite said comparing signal when said head channel selection signal has said first logic level if said standard play mode has been detected;
 generating said amplifier selection signal having the same phase as said comparing signal and generating the phase shift direction controlling signal having the same phase as said comparing signal when said head channel selection signal has said second logic level if said standard play mode has been detected; and
 generating said amplifier selection signal having said second logic level and generating the phase shift direction controlling signal having the same phase as said head channel selection signal when said standard play mode has not been detected.

6. The selecting device of claim 4, wherein said microcomputer provides:
 checking a running speed of the tape and determining if said standard play mode is being run if said slow reproduction function has been determined to have been selected;
 determining if said tape is in one of a running state and a stationary state when said standard play mode has been detected;
 generating said amplifier selection signal having said phase opposite of said head channel selection signal and generating the phase shift direction controlling signal having said first logic level if said standard play mode has been detected and said stationary state has been determined;
 generating said amplifier selection signal having the same phase as the comparing signal and generating the phase shift direction controlling signal having said phase opposite said comparing signal when said head channel selection signal has said first logic level if said standard play mode has been detected and said running state has been determined;
 generating said amplifier selection signal having the same phase as said comparing signal and generating the phase shift direction controlling signal having the same phase as said comparing signal when said head channel selection signal has said second logic level if said standard play mode has been detected and said running state has been determined;
 determining if said tape is in said one of the running state and the stationary state when said standard play mode has not been detected;
 generating said amplifier selection signal being in phase with said channel selection signal and generating the phase shift direction controlling signal having said second logic level if said standard play mode has not been detected and said stationary state has been determined; and
 generating said amplifier selection signal having said second logic level and generating the phase shift direction controlling signal having the same phase as said head channel selection signal if said standard play mode has not been detected and said running state has been determined.

7. The selecting device of claim 4, further comprised of said microcomputer:
 determining one of a standard, still, double speed, slow, and fast reproduction function selected by a user;
 checking a running speed of the tape and detecting whether said device is in a standard play mode if said determining step determines one of the standard, still, double speed, slow and fast reproduction functions;
 generating the amplifier selection signal having a first logic level and generating the phase shift direction controlling signal one hundred eighty degrees out of phase with said head channel selection signal if said device is in said standard play mode and said standard reproduction function has been determined;
 generating the amplifier selection signal having a second logic level and generating the phase shift direction controlling signal in phase with said head channel selection signal if said device is not in said standard play mode and said standard reproduction function has been determined;
 generating the amplifier selection signal in phase with said head channel selection signal and generating the phase shift direction controlling signal having said second logic level if said device is in said standard play mode and one of said still and double speed reproduction functions has been determined; and
 generating the amplifier selection signal one hundred eighty degrees out of phase with said head channel selection signal and generating the phase shift direction controlling signal having said first logic level if said device is not in said standard play mode and one of said still and double speed reproduction functions has been determined.

8. The selecting device of claim 4, wherein said microcomputer provides:
 inputting a comparing signal from a comparator, checking a running speed of the tape and determining if said device is in said standard play mode if said fast reproduction function has been determined;
 generating the amplifier selection signal in phase with said comparing signal and generating the phase shift direction controlling signal one hundred eighty degrees out of phase with said comparing signal when said head channel selection signal has said first logic level if said device is in said standard play mode;
 generating the amplifier selection signal in phase with said comparing signal and generating the phase shift direction controlling signal in phase with said comparing signal when said head channel selection signal has said second logic level if said device is in said standard play mode; and generating the amplifier selection signal having said second logic level and generating the phase shift direction controlling signal in phase with said head channel selection signal when said device is not in said standard play mode.

9. The selecting device of claim 4, wherein said microcomputer provides:

checking a running speed of the tape and determining if said device is in said standard play mode if said slow reproduction function has been determined;

determining whether said tape is in one of a running state and a stationary state when said device is in said standard play mode;

generating the amplifier selection signal one hundred eighty degrees out of phase with said head channel selection signal and generating the phase shift direction controlling signal having said first logic level if said device is in said standard play mode and said stationary state has been determined;

generating the amplifier selection signal in phase with a comparing signal and generating the phase shift direction controlling signal one hundred eighty degrees out of phase with said comparing signal when said head channel selection signal has said first logic level if said device is in said standard play mode and said running state has been determined;

generating the amplifier selection signal in phase with said comparing signal and generating the phase shift direction controlling signal in phase with said comparing signal when said head channel selection signal has said second logic level if said device is in said standard play mode and said running state has been determined;

determining whether said tape is in said one of the running state and the stationary state when said device is not in said standard play mode;

generating the amplifier selection signal in phase with said head channel selection signal and generating the phase shift direction controlling signal having said second logic level if said device is not in said standard play mode and said stationary state has been determined; and generating the amplifier selection signal having said second logic level and generating the phase shift direction controlling signal in phase with said head channel selection signal if said device is not in said standard play mode and said running state has been determined 10. A multifunctional control video head selecting method for a multifunctional control video head selecting device comprising:

first and second heads for standard play and for reading a video signal recorded on a tape;

a first amplifier for providing a first amplified signal by amplifying said video signal read by said first and second heads;

third and fourth heads for super long play and for reading said video signal recorded on the tape;

a second amplifier for providing a second amplified signal by amplifying said video signal read by said third and fourth heads;

a first switch connected between said first and second heads and said first amplifier for selectively providing one of said video signal read by the first head and said video signal read by the second head to said first amplifier;

a second switch connected between said third and fourth heads and said second amplifier for selectively providing one of the video signal read by said third head and the video signal read by said fourth head to said second amplifier;

a third switch for selectively providing one of the first amplified signal and the second amplified signal;

a servo controller for generating a speed control signal to control a drum motor and a capstan motor and for generating a head channel selection signal to control the first and second switches;

a comparator for providing a comparing signal by comparing the first and second amplified signals; and a microcomputer for providing a control signal to the servo controller through a first line connected only between the microcomputer and the servo controller, for generating an amplifier selection signal to control the third switch in accordance with receiving the head channel selection signal from the servo controller through a second line and receiving the comparing signal, and for generating a phase shift direction controlling signal to control a phase shift direction of said video signal corresponding to an azimuth angle of a selected head;

said multifunctional control video head selecting method comprising:

a first step occurring when the head channel selection signal is sent from the servo controller to said microcomputer on the second line, of selecting a reproducing function according to user inputted key data as one of a standard reproducing function, a still picture reproducing function, a double speed reproducing function, a slow picture reproducing function and a high speed reproducing function, and sending corresponding function control data of the control signal on the first line from the microcomputer to the servo controller;

a second step of determining while the standard reproducing function is selected, whether said device is in a standard play mode after checking a running speed of the tape;

a third step of determining while one of the still picture reproducing function and the double speed reproducing function is selected, whether said device is in the standard play mode after checking the running speed of the tape;

a fourth step of determining while the high speed reproducing function is selected, whether said device is in the standard play mode after checking the running speed of the tape upon inputting said comparing signal to said microcomputer;

a fifth step of determining while the slow picture reproducing function is selected, whether said device is in the standard play mode after checking the running speed of the tape;

a sixth step of determining whether said device is in a tape running state when said standard play mode is detected in said fifth step;

a seventh step of determining whether said device is in said tape running state when said standard play mode is not detected in said fifth step;

an eighth step of selecting the first amplifier and generating said phase shift direction controlling signal one hundred eighty degrees out of phase with said head channel selection signal when said standard play mode is detected in said second step;

a ninth step of selecting the second amplifier and generating the phase shift direction controlling signal in phase with the head channel selection signal when said standard play mode is not detected in said second step;

a tenth step of selecting one of the first and second amplifiers so that said amplifier selection signal is one hundred eighty degrees out of phase with said head channel selection signal, and for generating the phase shift direction controlling signal which leads the amplifier selection signal and the head channel selection signal when one of said standard play mode is detected in the fifth step and the tape running state is not detected in the sixth step;

an eleventh step of selecting one of the first and second amplifiers so that said amplifier selection signal is in phase with said head channel selection signal, when one of said standard play mode is not detected in the fifth step and the tape running state is not detected in the seventh step;

a twelfth step for selecting one of the first and second amplifiers so that the amplifier selection signal will be in phase with said comparing signal, and for generating the phase shift direction controlling signal one hundred eighty degrees out of phase with the comparing signal if said head channel selection signal has a first logic state, and for generating the phase shift direction controlling signal in phase with the comparing signal if said head channel selection signal has a second logic state, when one of said standard play mode is detected in said fifth step and the tape running state is detected in said sixth step; and a thirteenth step for selecting the second amplifier and for generating said phase shift direction controlling signal in phase with said head channel selection signal, when one of said standard play mode is not detected in said fifth step and the tape running state is detected in said seventh step.

11. A multifunctional control type video head selecting method for a multifunctional control type video head selecting device, said method comprising the steps of:

inputting a head channel selection signal, generated by a servo controller, through a first line to a microcomputer;

determining, in the microcomputer, one of a standard, still, double speed, slow, and fast reproduction function selected by a user and providing corresponding function control data to the servo controller through a second line connected only from the microcomputer to the servo controller;

checking a running speed of a tape and detecting whether said device is in a standard play mode when said determining step determines one of the standard, still, double speed, slow and fast reproduction function;

generating, in the microcomputer, both an amplifier selection signal having a first logic level, and a phase shift direction controlling signal one hundred eighty degrees out of phase with said head channel selection signal if said device is in said standard play mode and said standard reproduction function has been determined;

generating, in the microcomputer, both the amplifier selection signal having a second logic level, and said phase shift direction controlling signal in phase with said head channel selecting signal if said device is not in said standard play mode and said standard reproduction function has been determined;

generating, in the microcomputer, both the amplifier selection signal in phase with said head channel selection signal, and the phase shift direction controlling signal having said second logic level if said device is in said standard play mode and said one of said still and double speed reproduction functions has been determined; and generating, in the microcomputer, both the amplifier selection signal one hundred eighty degrees out of phase with said channel selection signal, and the phase shift direction controlling signal having said first logic level if said device is not in said standard play mode and said one of said still and double speed reproduction functions has been determined.

12. The multifunctional control type video head selecting method as claimed in claim 11, further comprising the steps of:

inputting a comparing signal from a comparator, checking a running speed of the tape and determining if said device is in said standard play mode if said fast reproduction function has been determined;

generating, in the microcomputer, both the amplifier selection signal in phase with said comparing signal, and the phase shift direction controlling signal one hundred eighty degrees out of phase with said comparing signal when said head channel selection signal has said first logic level if said device is in said standard play mode;

generating, in the microcomputer, both the amplifier selection signal in phase with said comparing signal, and the phase shift direction controlling signal in phase with said comparing signal when said head channel selection signal has said second logic level if said device is in said standard play mode; and generating, in the microcomputer, both the amplifier selection signal having said second logic level, and the phase shift direction controlling signal in phase with said head channel selection signal when said device is not in said standard play mode.

13. The multifunctional control type video head selecting method as claimed in claim 11, further comprising the steps of:

checking a running speed of the tape and determining if said device is in said standard play mode if said slow reproduction function has been determined;

determining if said tape is in one of a running state and a stationary state when said device is in said standard play mode;

generating, in the microcomputer, both the amplifier selection signal one-hundred eighty degrees out of phase with said head channel selection signal, and the phase shift direction controlling signal having said first logic level if said device is in said standard play mode and said stationary state has been determined;

generating, in the microcomputer, both the amplifier selection signal in phase with a comparing signal, and the phase shift direction controlling signal one hundred eighty degrees out of phase with said comparing signal when said head channel selection signal has said first logic level if said device is in standard play mode and said running state has been determined;

generating, in the microcomputer, both the amplifier selection signal in phase with said comparing signal, and the phase shift direction controlling signal in phase with said comparing signal when said head channel selection signal has said second logic level if said device is in said standard play mode and said running state has been determined;

determining whether said tape is in said one of the running state and the stationary state when said device is not in said standard play mode;

generating, in the microcomputer, both the amplifier selection signal in phase with said head channel selection signal, and the phase shift direction controlling signal having said second logic level if said device is not in said standard play mode and said stationary state has been determined; and generating, in the microcomputer, both the amplifier selection signal having said second logic level, and the phase shift direction controlling signal in phase with said head channel selection signal if said device is not in said standard play mode and said running state has been determined.

14. A multifunctional control video head selecting device for use in a video tape recorder, comprising:

first and second heads for reading during a standard play mode, a video signal recorded on a tape;

third and fourth heads for reading during a long play mode, said video signal recorded on the tape;

a first switch for selectively outputting the video signal read by said first and second heads;

a second switch for selectively outputting the video signal read out by said third and fourth heads;

a third switch, connected to output terminals of said first and second switches, for outputting the video signal selectively output by said first and second switches;

a comparator for producing a comparing signal by comparing said selected video signal output by said first switch and said selected video signal output by said second switch; and control means comprised of:

a servo controller for generating a head channel selection signal to control said first and second switches and for generating a speed control signal to control a drum motor and a capstan motor; and a microcomputer for receiving said head channel selection signal through a first line from the servo controller, for generating control signals to control said servo controller through a second line connected only between the microcomputer and the servo controller, for generating an amplifier selection signal to control said third switch in accordance with the head channel selection signal and the comparing signal, for generating a phase shift direction controlling signal to control a phase shift direction of said video signal corresponding to an azimuth angle of a selected head, for determining whether one of a standard, still, double speed, slow, and fast reproduction function has been selected by a user, for checking a running speed of the tape and detecting whether a standard play mode is being run if said determining step determines that said one of the standard, still, double speed, slow and fast reproduction function has been selected, for generating said amplifier selection signal having a first logic level and generating the phase shift direction controlling signal having a phase opposite to a phase of said head channel selection signal if said standard play mode is detected and said standard reproduction mode has been determined, for generating said amplifier selection signal having a second logic level and generating the phase shift direction controlling signal having the same phase as said phase of said channel selection signal if said standard play mode has not been detected and said standard reproduction mode has been determined, for generating said amplifier selection signal having the same phase as said channel selection signal and generating the phase shift direction controlling signal having said second logic level if said standard play mode has been detected and said one of said still and said double speed reproduction function has been determined, and for generating said amplifier selection signal having said phase opposite the phase of said channel selection signal and generating the phase shift direction controlling signal having said first logic level if said standard play mode has not been detected and said one of said still and said double speed reproduction function has been determined.

15. The selecting device of claim 14, further comprised of said microcomputer:

inputting a comparing signal from a comparator, checking a running speed of the tape and determining if said standard play mode is being run if said fast reproduction function has been determined to have been selected;

generating said amplifier selection signal having the same phase as said comparing signal and generating the phase shift direction controlling signal having said phase opposite said comparing signal when said head channel selection signal has said first logic level if said standard play mode has been detected;

generating said amplifier selection signal having the same phase as said comparing signal and generating the phase shift direction controlling signal having the same phase as said comparing signal when said head channel selection signal has said second logic level if said standard play mode has been detected; and generating said amplifier selection signal having said second logic level and generating the phase shift direction controlling signal having the same phase as said head channel selection signal when said standard play mode has not been detected.

16. The selecting device of claim 14, wherein said microcomputer provides:

checking a running speed of the tape and determining if said standard play mode is being run if said slow reproduction function has been determined to have been selected;

determining if said tape is in one of a running state and a stationary state when said standard play mode has been detected;

generating said amplifier selection signal being one hundred eighty degrees out of phase with said head channel selection signal and generating the phase shift direction controlling signal having said first logic level if said standard play mode has been detected and said stationary state has been determined;

generating said amplifier selection signal having the same phase as the comparing signal and generating the phase shift direction controlling signal having said phase opposite said comparing signal when said head channel selection signal has said first logic level if said standard play mode has been detected and said running state has been determined;

generating said amplifier selection signal having the same phase as said comparing signal and generating the phase shift direction controlling signal having the same phase as said comparing signal when said head channel selection signal has said second logic level if said standard play mode has been detected and said running state has been determined;

determining if said tape is in said one of the running state and the stationary state when said standard play mode has not been detected;

generating said amplifier selection signal being in phase with said channel selection signal and generating the phase shift direction controlling signal having said second logic level if said standard play mode has not been detected and said stationary state has been determined; and generating said amplifier selection signal having said second logic level and generating the phase shift direction controlling signal having the same phase as said head channel selection signal if said standard play mode has not been detected and said running state has been determined.

17. The selecting device of claim 14, further comprised of said microcomputer:

determining one of a standard, still, double speed, slow, and fast reproduction function selected by a user;

checking a running speed of the tape and detecting whether said device is in a standard play mode if said determining step determines one of the standard, still, double speed, slow and fast reproduction functions;

generating the amplifier selection signal having a first logic level and generating the phase shift controlling signal one hundred eighty degrees out of phase with said head channel selection signal if said device is in said standard play mode and said standard reproduction function has been determined;

generating the amplifier selection signal having a second logic level and generating the phase shift direction controlling signal in phase with said head channel selection signal if said device is not in said standard play mode and said standard reproduction function has been determined;

generating the amplifier selection signal in phase with said head channel selection signal and generating the phase shift direction controlling signal having said second logic level if said device is in said standard play mode and one of said still and double speed reproduction functions has been determined; and generating the amplifier selection signal one hundred eighty degrees out of phase with said head channel selection signal and generating the phase shift direction controlling signal having said first logic level if said device is not in said standard play mode and one of said still and double speed reproduction functions has been determined.

18. The selecting device of claim 14, wherein said microcomputer provides:

inputting a comparing signal from a comparator, checking a running speed of the tape and determining if said device is in said standard play mode if said fast reproduction function has been determined;

generating the amplifier selection signal in phase with said comparing signal and generating the phase shift direction controlling signal one hundred eighty degrees out of phase with said comparing signal when said head channel selection signal has said first logic level if said device is in said standard play mode;

generating the amplifier selection signal in phase with said comparing signal and generating the phase shift direction controlling signal in phase with said comparing signal when said head channel selection signal has said second logic level if said device is in said standard play mode; and generating the amplifier selection signal having said second logic level and generating the phase shift direction controlling signal in phase with said head channel selection signal when said device is not in said standard play mode.

19. The selecting device of claim 14, wherein said microcomputer provides:

checking a running speed of the tape and determining if said device is in said standard play mode if said slow reproduction function has been determined;

determining whether said tape is in one of a running state and a stationary state when said device is in said standard play mode;

generating the amplifier selection signal one hundred eighty degrees out of phase with said head channel selection signal and generating the phase shift direction controlling signal having said first logic level if said device is in said standard play mode and said stationary state has been determined;

generating the amplifier selection signal in phase with a comparing signal and generating the phase shift direction controlling signal one hundred eighty degrees out of phase with said comparing signal when said head channel selection signal has said first logic level if said device is in said standard play mode and said running state has been determined;

generating the amplifier selection signal in phase with said comparing signal and generating the phase shift direction controlling signal in phase with said comparing signal when said head channel selection signal has said second logic level if said device is in said standard play mode and said running state has been determined;

determining whether said tape is in said one of the running state and the stationary state when said device is not in said standard play mode;

generating the amplifier selection signal in phase with said head channel selection signal and generating the phase shift direction controlling signal having said second logic level if said device is not in said standard play mode and said stationary state has been determined; and generating the amplifier selection signal having said second logic level and generating the phase shift direction controlling signal in phase with said head channel selection signal if said device is not in said standard play mode and said running state has been determined.

20. A multifunctional control video head selecting method for a multifunctional control video head selecting device comprising:

first and second heads for standard play and for reading a video signal recorded on a tape;

a first amplifier for providing a first amplified signal by amplifying said video signal read by said first and second heads;

third and fourth heads for super long play and for reading said video signal recorded on the tape;

a second amplifier for providing a second amplified signal by amplifying said video signal read by said third and fourth heads;

a first switch connected between said first and second heads and said first amplifier for selectively providing one of said video signal read by the first head and said video signal read by the second head to said first amplifier;

a second switch connected between said third and fourth heads and said second amplifier for selectively providing one of the video signal read by said third head and the video signal read by said fourth head to said second amplifier;

a third switch for selectively providing one of the first amplified signal and the second amplified signal;

a comparator for providing a comparing signal by comparing the first and second amplified signals; and control means consisting of a servo controller for generating a speed control signal to control a drum motor and a capstan motor and for generating a head channel selection signal to control the first and second switches, and a microcomputer for providing a control signal to the servo controller through a first line connected only from the microcomputer to the servo controller, for generating an amplifier selection signal to control the third switch in accordance with receiving the head channel selection signal from the servo controller through a second line and receiving the comparing signal, and for generating a phase shift direction controlling signal to control a phase shift direction of said video signal corresponding to an azimuth angle of a selected head, said multifunctional control video head selecting method comprising:

a first step occurring when the head channel selection signal is sent from the servo controller to said microcomputer on the second line, of selecting a reproducing function according to user inputted key data as one of a standard reproducing function, a still picture reproducing function, a double speed reproducing function, a slow picture reproducing function and a high speed reproducing function, and sending corresponding function control data of the control signal on the first line from the microcomputer to the servo controller;

a second step of determining while the standard reproducing function is selected, whether said device is in a standard play mode after checking a running speed of the tape;

a third step of determining while one of the still picture reproducing function and the double speed reproducing function is selected, whether said device is in the standard play mode after checking the running speed of the tape;

a fourth step of determining while the high speed reproducing function is selected, whether said device is in the standard play mode after checking the running speed of the tape upon inputting said comparing signal to said microcomputer;

a fifth step of determining while the slow picture reproducing function is selected, whether said device is in the standard play mode after checking the running speed of the tape;

a sixth step of determining whether said device is in a tape running state when said standard play mode is detected in said fifth step;

a seventh step of determining whether said device is in said tape running state when said standard play mode is not detected in said fifth step;

an eighth step of selecting the first amplifier and generating said phase shift direction controlling signal one hundred eighty degrees out of phase with said head channel selection signal when said standard play mode is detected in said second step;

a ninth step of selecting the second amplifier and generating the phase shift direction controlling signal in phase with the head channel selection signal when said standard play mode is not detected in said second step;

a tenth step of selecting one of the first and second amplifiers so that said amplifier selection signal is one hundred eighty degrees out of phase with said head channel selection signal, and for generating the phase shift direction controlling signal which leads the amplifier selection signal and the head channel selection signal when one of said standard play mode is detected in the third step and the tape running state is not detected in the sixth step;

an eleventh step of selecting one of the first and second amplifiers so that said amplifier selection signal is in phase with said head channel selection signal, when one of said standard play mode is not detected in the fifth step and the tape running state is not detected in the seventh step;

a twelfth step for selecting one of the first and second amplifiers so that the amplifier selection signal will be in phase with said comparing signal, and for generating the phase shift direction controlling signal one hundred eighty degrees out of phase with the comparing signal if said head channel selection signal has a first logic state, and for generating the phase shift direction controlling signal in phase with the comparing signal if said head channel selection signal has a second logic state, when one of said standard play mode is detected in said fifth step and the tape running state is detected in said sixth step; and a thirteenth step for selecting the second amplifier and for generating said phase shift direction controlling signal in phase with said head channel selection signal, when one of said standard play mode is not detected in said fifth step and the tape running state is detected in said seventh step.

* * * * *

UNITED STATES PATENT AND TRADEMARK OFFICE
CERTIFICATE OF CORRECTION

PATENT NO. : 5,291,342
DATED : March 1, 1994
INVENTOR(S) : Yong-Jin Kim

It is certified that error appears in the above-indentified patent and that said Letters Patent is hereby corrected as shown below:

IN THE TITLE

Title Page, [54], Change title to --A DEVICE AND METHOD FOR SECTION OF A HEAD CHANNEL SELECTING SIGNAL IN A MULTIFUNCTIONAL VTR--.

IN THE CLAIMS

Column 11, Line 2, After "logic", Insert --level-- .

Signed and Sealed this

Twenty-first Day of February, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,291,342
DATED : March 1, 1994
INVENTOR(S) : Yong-jin Kim

It is certified that error appears in the above-indentified patent and that said Letters Patent is hereby corrected as shown below:

Column 21, line 40, after "shift", Insert --direction --.

Signed and Sealed this

Twenty-first Day of November, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,291,342
DATED : March 1, 1994
INVENTOR(S) : Yong-jin Kim

It is certified that error appears in the above-indentified patent and that said Letters Patent is hereby corrected as shown below:

Column 11, Line 2, After "logic", Insert --level-- ;

Column 21, Line 40, After "shift", Insert --direction-- .

Signed and Sealed this

Thirtieth Day of January, 1996

Attest:

BRUCE LEHMAN

Attesting Officer

Commissioner of Patents and Trademarks